US010935600B2

(12) United States Patent
Raju et al.

(10) Patent No.: US 10,935,600 B2
(45) Date of Patent: Mar. 2, 2021

(54) DYNAMIC SECURITY PROTECTION IN CONFIGURABLE ANALOG SIGNAL CHAINS (71) Applicant: Texas Instruments Incorporated, Dallas, TX (US)

(72) Inventors: Veeramanikandan Raju, Bangalore (IN); Anand Kumar G, Bengaluru (IN); Christy Leigh She, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 45 days.

(21) Appl. No.: 16/376,697

(22) Filed: Apr. 5, 2019

(65) Prior Publication Data
US 2020/0319250 A1 Oct. 8, 2020

(51) Int. Cl.
G01R 31/3185 (2006.01)
G06F 21/45 (2013.01)
(Continued)

(52) U.S. Cl.
CPC ..... *G01R 31/318536* (2013.01); *G06F 21/31* (2013.01); *G06F 21/45* (2013.01); *H04L 63/1433* (2013.01)

(58) Field of Classification Search
CPC . G01R 31/318536; G06F 21/31; G06F 21/45; H04L 63/1433
See application file for complete search history.

(56) References Cited

U.S. PATENT DOCUMENTS 6,240,446 B1 * 5/2001 Casper ............... G06F 11/1004
709/213
2009/0039897 A1 2/2009 Fong
(Continued)

FOREIGN PATENT DOCUMENTS

CN 102393484 A 3/2012
WO WO2019064059 A1 4/2019

OTHER PUBLICATIONS

PCT International Search Report; PCT/US 2020/026823; dated Jun. 25, 2020.

*Primary Examiner* — Duc C Ho
(74) *Attorney, Agent, or Firm* — Ebby Abraham; Charles A. Brill; Frank D. Cimino (57) ABSTRACT A system and method for dynamically protecting against security vulnerabilities in a reconfigurable signal chain. The system includes a signal chain formed from at least a first component connected with a second component. The first component has a set of source outputs and a first authentication block, and the second signal chain component has a set of destination inputs and a second authentication block. The system also includes a signal chain configurator that populates the first authentication block with at least one validated endpoint from the set of destination inputs. A signal chain integrity block, which is communicatively coupled with the first authentication block and the second authentication block, identifies a source-destination pair from one or more endpoint pairs formed from the at least one validated endpoint and the set of source outputs. The signal chain integrity block propagates the source-destination pair to the first authentication block and the second authentication block. The second authentication block authenticates any received input using the source-destination pair.

20 Claims, 7 Drawing Sheets (51) Int. Cl.
*G06F 21/31* (2013.01)
*H04L 29/06* (2006.01)

(56) References Cited

U.S. PATENT DOCUMENTS

2011/0291868 A1 12/2011 Kehl
2017/0308872 A1* 10/2017 Uhr .................... G06F 16/9566

* cited by examiner

FIGURE 1-7. EPIAUTH REGISTER

| 31 | 30 | 29 | 28 | 27 | 26 | 25 | 24 |
|----|----|----|----|----|----|----|----|
| RESERVED ||||||||
| R/W-0x0 ||||||||
| 23 | 22 | 21 | 20 | 19 | 18 | 17 | 16 |
| RESERVED ||||||||
| R/W-0x0 ||||||||
| 15 | 14 | 13 | 12 | 11 | 10 | 9 | 8 |
| RESERVED |||| IP11 | IP10 | IP9 | IP8 |
| R/W-0x0 |||| R/W-0x0 | R/W-0x0 | R/W-0x0 | R/W-0x0 |
| 7 | 6 | 5 | 4 | 3 | 2 | 1 | 0 |
| IP7 | IP6 | IP5 | IP4 | IP3 | IP2 | IP1 | IP0 |
| R/W-0x0 | R/W-0x0 | R/W-0x0 | R/W-0x0 | R/W-0x0 | R/W-0x0 | R/W-0x0 | R/W-0x0 |

DYNAMIC SECURITY PROTECTION IN CONFIGURABLE ANALOG SIGNAL CHAINS

BACKGROUND

Technical Field

The present disclosure relates to dynamic protection of configurable analog signal chains from security vulnerabilities.

Description of Related Art

The Internet of Things (TOT) is the network allowing attached devices to interact and exchange data. Security for IoT-enabled devices is crucial given their increased sensing and processing load. Next generation IoT nodes with sensing nodes implement reconfigurable signal chain combinations having multiple analog parts, such as Analog to Digital Converters (ADCs), Digital to Analog converters (DACs), Comparators (COMPs), Reference Voltage and/or Currents (REFs), Operational Amplifiers (OPAMPs), etc., to ensure sensing is enabled to a cloud. While there are methods available to secure the data originating from the analog signal chain using next generation Advanced Reduced Instruction Set Computing Machine (ARM) based devices, end nodes still lack the ability to prevent formation of a wrong signal chain or to prevent unauthorized access to the sensing/actuator data over an analog signal chain. Currently there are no systems or methods available for interacting with hardware to perform a dynamic run-time integrity check between the signal chain inputs/outputs or across components/input-output pins in a given system on a chip (SoC).

Figure 1:
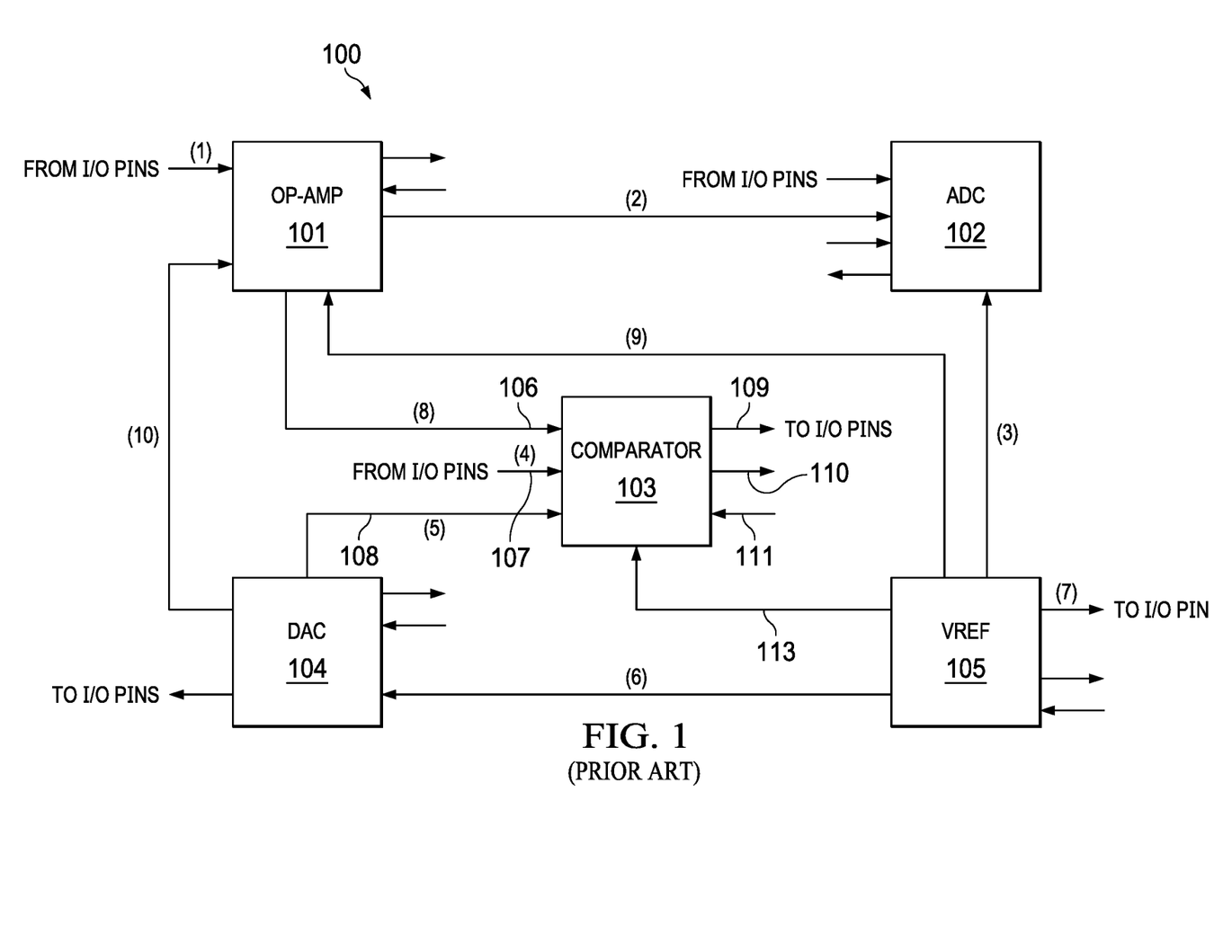
FIG. 1 illustrates a prior art analog signal chain formed from a collection of interconnected analog components.

FIG. 1 generally illustrates a conventional analog signal chain (100) that includes an OPAMP (101), an ADC (102), a COMP (103), a DAC (104), and a VRef (105). The COMP (103) receives a plurality of inputs, namely an input (106) from the OPAMP (101), an input (107) from a source external to the SOC, another input (108) from the DAC (104), and an input (113) from the VRef (105). These connections between the various components of the signal chain (100) are typically wired.

If any of the components are compromised, then the signal chain (100) is vulnerable to intrusion and/or malfunction. For example, if the signal chain (100) is implemented in an IoT system with the output (109, 110) from the COMP (103) acting as a control signal to open a door, the validity of the output (109, 110) is dependent upon valid, uncompromised inputs. If the DAC (104) output (108) is compromised, the COMP (103) may unintentionally activate the door, presenting security risks in not only the analog signal chain and but possibly the entire system.

Because the signal chain (100) is pre-wired and fixed, there is a need for establishing signal chain integrity at run-time and/or at boot time. Also, because software-reconfigurable signal chains are an emerging differentiation in micro controller space, there is also a need to reconfigure analog signal chains locally and remotely.

SUMMARY

Novel aspects of the disclosure are directed to a method for dynamically authenticating a signal chain formed from a set of components that includes a first component and a second component. In a signal chain formed from at least a first component connected to a second component, the first component including a set of source outputs and a first authentication block and the second component including a set of destination inputs and a second authentication block, one or more validated endpoints are received into the first component. The one or more validated endpoints are selected from the set of destination inputs. Each of the one or more validated endpoints are associated with a source output from the set of source outputs to form a set of endpoint pairs, and then a source-destination pair is identified from the set of endpoint pairs. The source-destination pair is propagated to the first authentication block and the second authentication block. At least a portion of the signal chain is authenticated based on the source-destination pair, and a received input is authenticated based on the source-destination pair.

Novel aspects of the disclosure are also directed to a system for dynamically authenticating a signal chain. The system includes a signal chain formed from at least a first component connected with a second component. The first component has a set of source outputs and a first authentication block, and the second signal chain component has a set of destination inputs and a second authentication block. The system also includes a signal chain configurator that populates the first authentication block with at least one validated endpoint from the set of destination inputs. A signal chain integrity block, which is communicatively coupled with the first authentication block and the second authentication block, identifies a source-destination pair from one or more endpoint pairs formed from the at least one validated endpoint and the set of source outputs. The signal chain integrity block propagates the source-destination pair to the first authentication block and the second authentication block. The second authentication block authenticates any received input using the source-destination pair.

DETAILED DESCRIPTION

As used herein, the term "analog component" means an analog design block capable of performing analog functions. Examples of analog components can include the ADCs, DACs, COMPs, REFs, and OPAMPs that were previously mentioned. The term "analog signal chain" refers to a collection of interconnected, analog components and in some instances, input-output pins. For example, an analog signal chain can be formed from a COMP connected to a DAC. The term "endpoint" refers to an input to a destination component. In the exemplary analog signal chain formed from a connection between an output of the COMP (i.e., a source output) to an input of the DAC (i.e., a destination input), the endpoint is the input to the DAC. A "validated endpoint" refers to an endpoint that has been pre-programmed as valid. In a non-limiting embodiment, endpoints programmed into an "endpoint table" are validated endpoints selected from a set of destination inputs. An example of an endpoint table is described in more detail in the paragraphs that follow. An "endpoint pair" refers to a pairing of a validated endpoint with its corresponding source output. In the exemplary signal chain formed from the COMP and the DAC, the endpoint pair is the output of the COMP and the input of the DAC. The term "source-destination pair" refers to the two signal chain components connected by an endpoint pair. The source-destination pair in the foregoing example is COMP-DAC.

Various embodiments are described herein which implement the novel aspects of a reconfigurable signal chain. For example, one embodiment provides a hardware mechanism and related method to dynamically authenticate the signal chain formation at run-time to ensure there is no snooping vulnerabilities or incorrect signal chain formation. Another embodiment provides a hardware mechanism at run-time for confirming that signal chain components are authorized to negotiate data exchange. In the event of a conflict or invalid authentication, hardware may be enabled to raise a security alarm to the system to take necessary recovery actions. Yet another embodiment provides a hardware mechanism at run-time that would confirm whether the necessary input/output configurations are valid for a signal chain having direct connections with modules external to the SoC.

Figure 2:
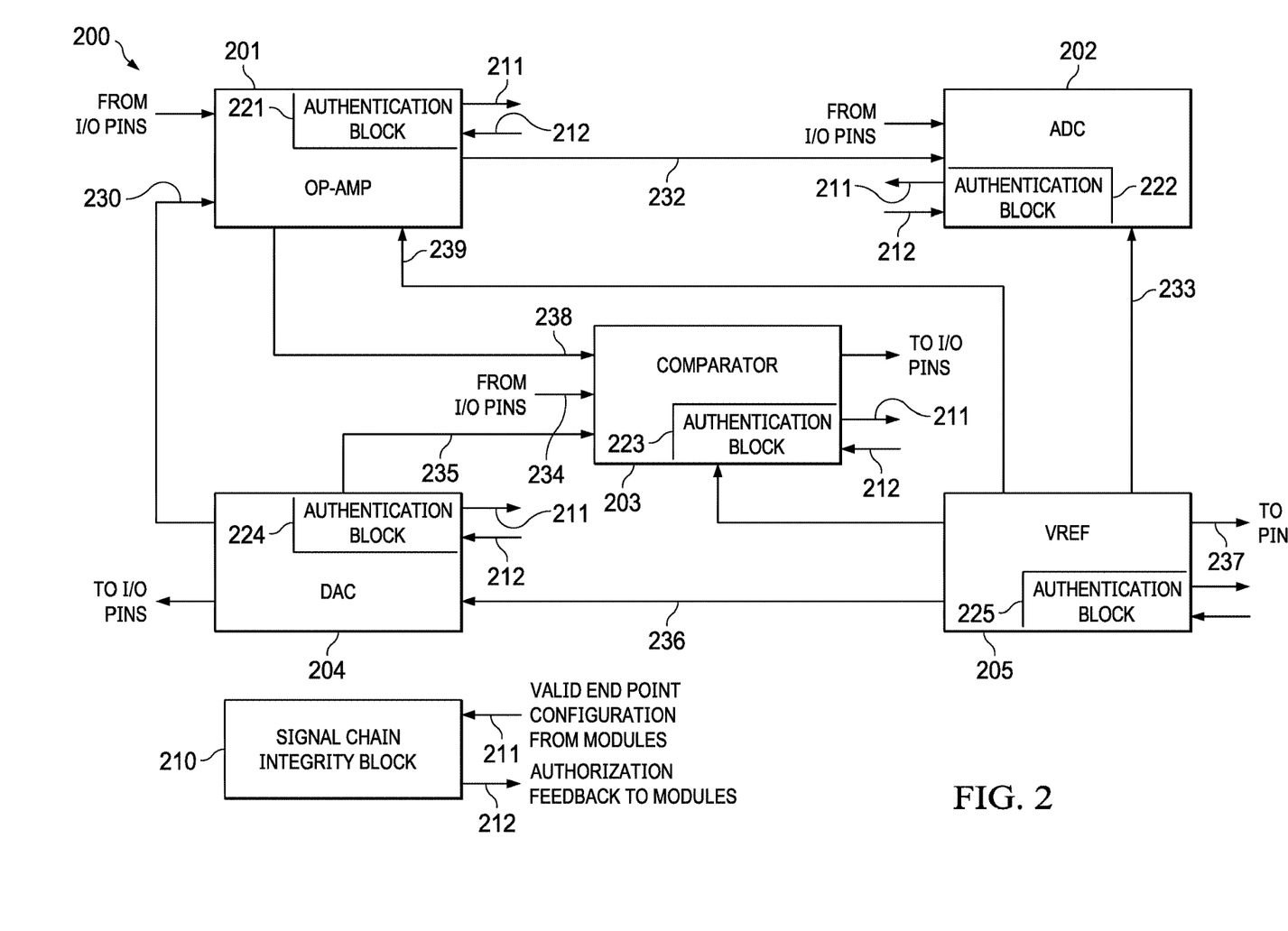
FIG. 2 illustrates an exemplary analog signal chain formed from a collection of interconnected analog components.

FIG. 2 generally illustrates an analog signal chain in accordance with an illustrative embodiment. The analog signal chain (200) includes a collection of interconnected analog components, namely an OPAMP (201), an ADC (202), a COMP (203), a DAC (204), and a VRef (205). Connections between components are shown by arrows pointing in the direction from the source component to the destination component. It should be noted that while FIG. 2 depicts analog components, digital circuits and digital components may be included in the signal chain (200). In addition, the VRef (205) may be replaced by a reference current, IRef.

Figure 5:
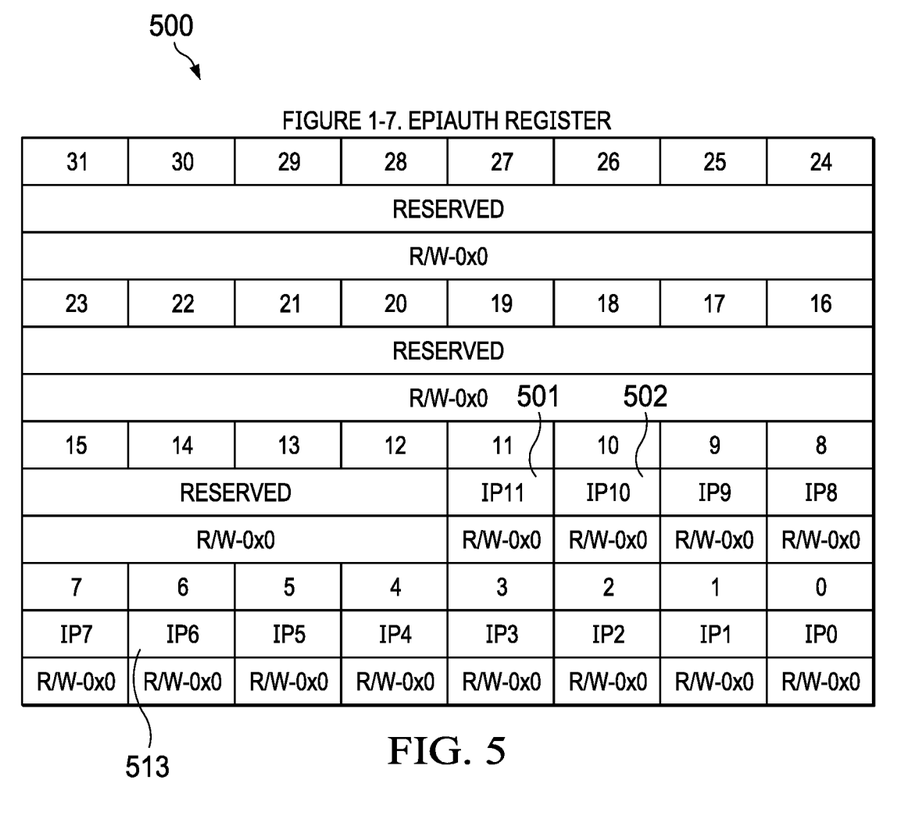
FIG. 5 illustrates an exemplary authorization register for validated destination inputs (validated endpoints) in a comparator.

Each signal chain component includes an authentication block that facilitates authentication of connections between signal chain components and reconfiguration of one or more signal chains (or portions of a signal chain) in response to detecting a security threat or error condition. In a non-limiting embodiment, the authentication block includes a data register that associates each of the validated endpoints with a corresponding source output. An exemplary data register is depicted in FIG. 5 that follows. With particular reference to FIG. 2, the OPAMP (201) has an authentication block (221), the ADC (202) has an authentication block (222), the Comparator (203) has an authentication block (223), the DAC (204) has an authentication block (224), and the VRef (205) has an authentication block (225). Each authentication block is communicatively coupled to a signal chain integrity block (210) to allow transmission of an output signal (211) and receipt of an input signal (212). The output signal (211) provides the signal chain integrity block (210) with data identifying the validated endpoints associated with a given source output of a signal chain component, and the input signal (212) provides information (e.g., source-destination pairs) that can be later used to authenticate signals and/or reconfiguration of a signal chain.

In one embodiment, validated endpoints are programmed into an authentication block with reference to an endpoint table that can be populated by a user. For example, the user may interact with a system configuration tool, shown in FIG. 3, to identify one or more validated endpoints from a set of destination inputs as well as any corresponding source inputs. An example of an endpoint table is depicted in Table 1, populated with data derived from the system in FIG. 3.

TABLE 1

Exemplary Endpoint Table

Figure 3:
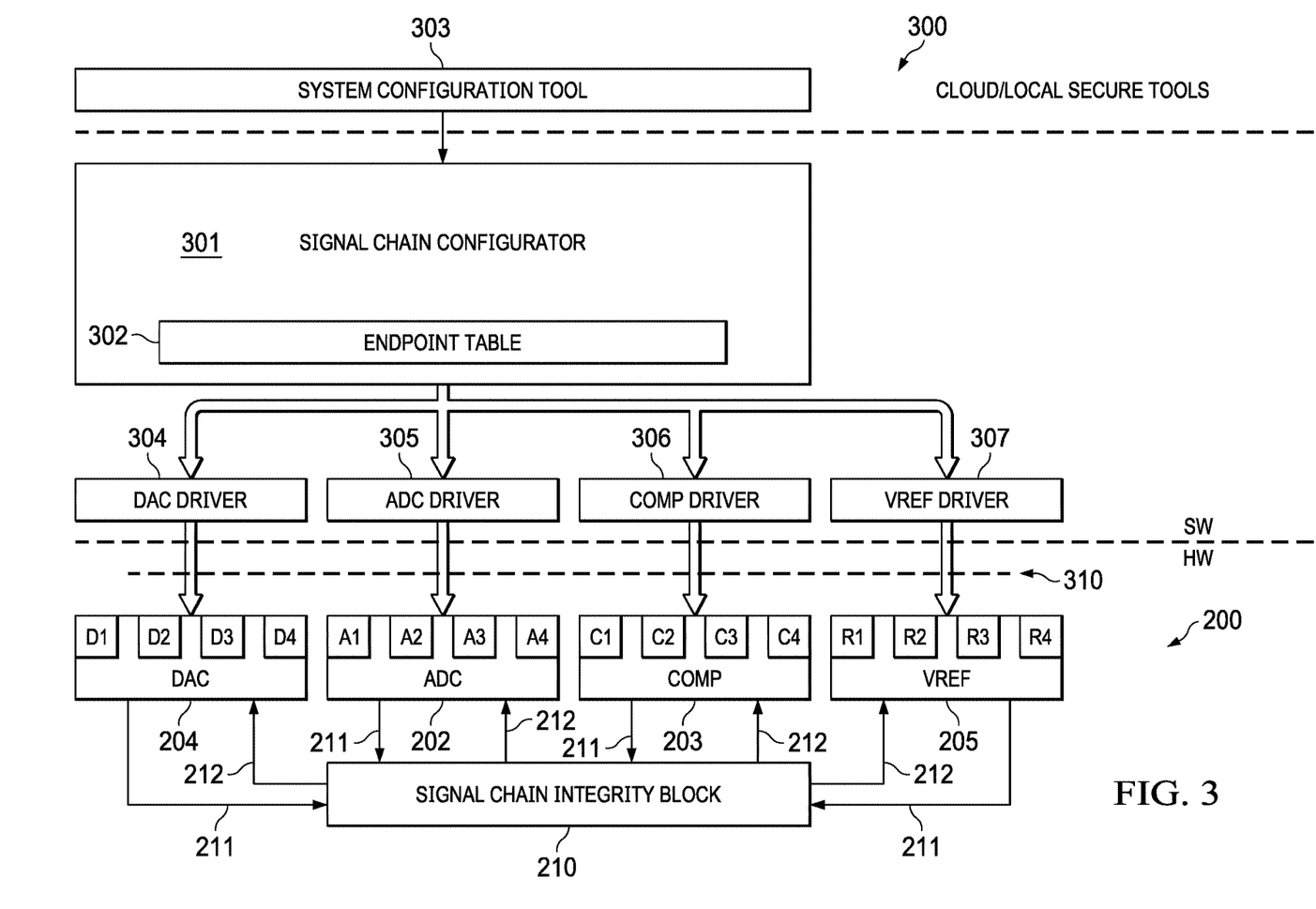
FIG. 3 illustrates an exemplary system with an analog signal chain formed from a collection of analog components.

| Source Output | Destination Input (Validated Endpoints) |
|---|---|
| D1 | C3 |
| D3 | C4 |
| C2 | D2 |
| C3 | D4 |
| . . . | . . . |

With reference to FIG. 3, DAC (314) includes connectors D1, D2, D3, and D4, which can serve as source outputs or destination inputs. Likewise, COMP 316 includes connectors C1, C2, C3, and C4, which can also serve as source outputs or destination inputs. A user deciding that the source output D1 of DAC 314 should connect to destination input C3 of COMP 316 populates the first row of the endpoint table as shown above. By identifying C3 as the destination input for D1, the endpoint is validated. Likewise, a user can specify that the source output D3 of DAC 314 should connect to destination input C4 of COMP 316 and modify the endpoint table as appropriate. The process is repeated for every signal chain component as necessary. In Table 1, the endpoint pairs are formed between the source outputs and destination inputs originating from signal chain components; however, in alternate embodiments, the source outputs and/or destination inputs can be general purpose input output (GPIO) pins or fixed function peripheral pins. Additionally, while the endpoint table is depicted in tabular format, other data structures can also be implemented.

In instances where a security vulnerability is detected, a user may invalidate one or more endpoints by deleting a destination input from the endpoint table corresponding to the analog blocks that are security vulnerable. Modification of the endpoint table results in the ability to reconfigure and reset at least a portion of the signal chain during run-time, which ensures the integrity of the analog chain.

The data stored in the endpoint table can be programmed into the various authentication blocks (221-225) by drivers assigned to their respective signal chain component. For example, with reference again to FIG. 3, DAC driver (304) can program C3 as a validated endpoint (i.e., a destination input) for source output D1. In another embodiment, a single linked driver of the SoC may be responsible for programming validated endpoints into the various authentication blocks. Additional detail regarding programming of authentication blocks is provided in the discussion of FIGS. 3-6.

With reference back to FIG. 2, the signal chain integrity block (210) obtains the validated endpoints from each of the signal chain components through their respective output signals (211) and determines the source output of each, identifying endpoint pairs. In a non-limiting embodiment, the signal chain integrity block (210) obtains the validated endpoint information from a register, an example of which is shown in FIG. 5. The signal chain integrity block (210) also identifies source-destination pairs from the endpoint pairs and maintains a data structure to store that information. An exemplary data structure maintained by the signal chain integrity block (210) is provided in Table 2 that follows.

TABLE 1

Exemplary Source-Destination Pair Table

| Source - Destination Pair | Endpoint Pairs |
|---|---|
| DAC-COMP | D1-C3, D3-C4 |
| COMP-DAC | C2-D2, C3-D4 |
| ADC-REF | A1-R3 |
| REF-COMP | R2-C3, R2-C4 |
| . . . | . . . |

The signal chain integrity block (210) can then propagate the source-destination pairs throughout the signal chain. In one embodiment, the source-destination pairs are selectively transmitted to only the two components identified in the source-destination pair; however, in another embodiment, each source-destination pair is transmitted to every signal chain component.

The authentication blocks in each of the components stores the source-destination pairs to identify the various source outputs to which its destination inputs can receive information. When a component receives an input during run-time, the component can determine, based on the stored source-destination pairs, if the input is from a valid source and authenticate or reject the input. Thus, in at least one embodiment, the signal chain components authenticate and process an input received with the authentication block. The signal chain components can inform the application level or software level if an error is encountered during authentication.

FIG. 3 illustrates an expanded system (300) for dynamic security authentication of an analog signal chain, which includes the signal chain (200) of FIG. 2. The system (300) includes a software layer with a signal chain configurator (301) that maintains an endpoint table (302) that can be populated by a user interfacing with a system configuration tool (303). In a non-limiting embodiment, the system configuration tool (300) is maintained separate from the software layer, such as in the cloud.

The signal chain configurator (301) programs registers in the authentication blocks of the signal chain components with validated endpoints for each of their respective source outputs. In the example depicted in FIG. 3, the signal chain configurator (301) programs each of the various authentication blocks through their respective drivers (304, 305, 306, 307). In at least one example, each of the drivers can be authenticated through a peripheral fire wall. The peripheral fire wall (310) between the drivers and the analog components may further filter and authenticate the programming of the analog components. The authentication at the peripheral fire wall provides another degree of security to the analog signal chain.

Each of the analog components can authenticate an input received on one of its destination inputs during run-time based source-destination pairs formed from validated endpoints received by the component with the corresponding source output. For instance, if an input (235) is presented to the COMP (203) from the DAC (204), the authentication block (223) checks if the DAC (204) is a valid source component. If the DAC (204) is a valid source component, then the input is authenticated and processed. In some examples, the source may include multiple inputs and/or an input code. If a received input cannot be authenticated, an error is generated and reported to an application or software layer (not shown). In at least one embodiment, each of the signal chain components authenticates input signals and maintains signal chain integrity during run-time. In some instances, the signal chain components authenticate an input signal and maintain signal chain integrity during boot time. In other instances, the signal chain components authenticate output signals instead of input signal during run-time or boot time. A hardware mechanism operating in conjunction with the authentication block may check at run-time whether input and output components are allowed to negotiate data exchange. If there is a conflict or invalid authentication, hardware (analog components) may raise a security alarm to the system application and/or software to take recovery actions. In other instances, the authentication block would check at run-time if the input/output (IO) configurations are valid for external IO pin(s) in the system that are not directly transmitted or received from another component. In some embodiments, the security alarm may be provided locally or on a network located remotely to other nodes in the IoT network.

In another example, a system application and/or software defines an endpoint table to identify authentic input signals that are allowed to be configured as input(s) to the component. In at least one embodiment, a system application and/or software identifies authentic outputs signals that are allowed to be used by rest of the components in the system. The system application and/or software may be configurable for different end equipment using silicon-based devices having a capability to reconfigure.

Figure 4:
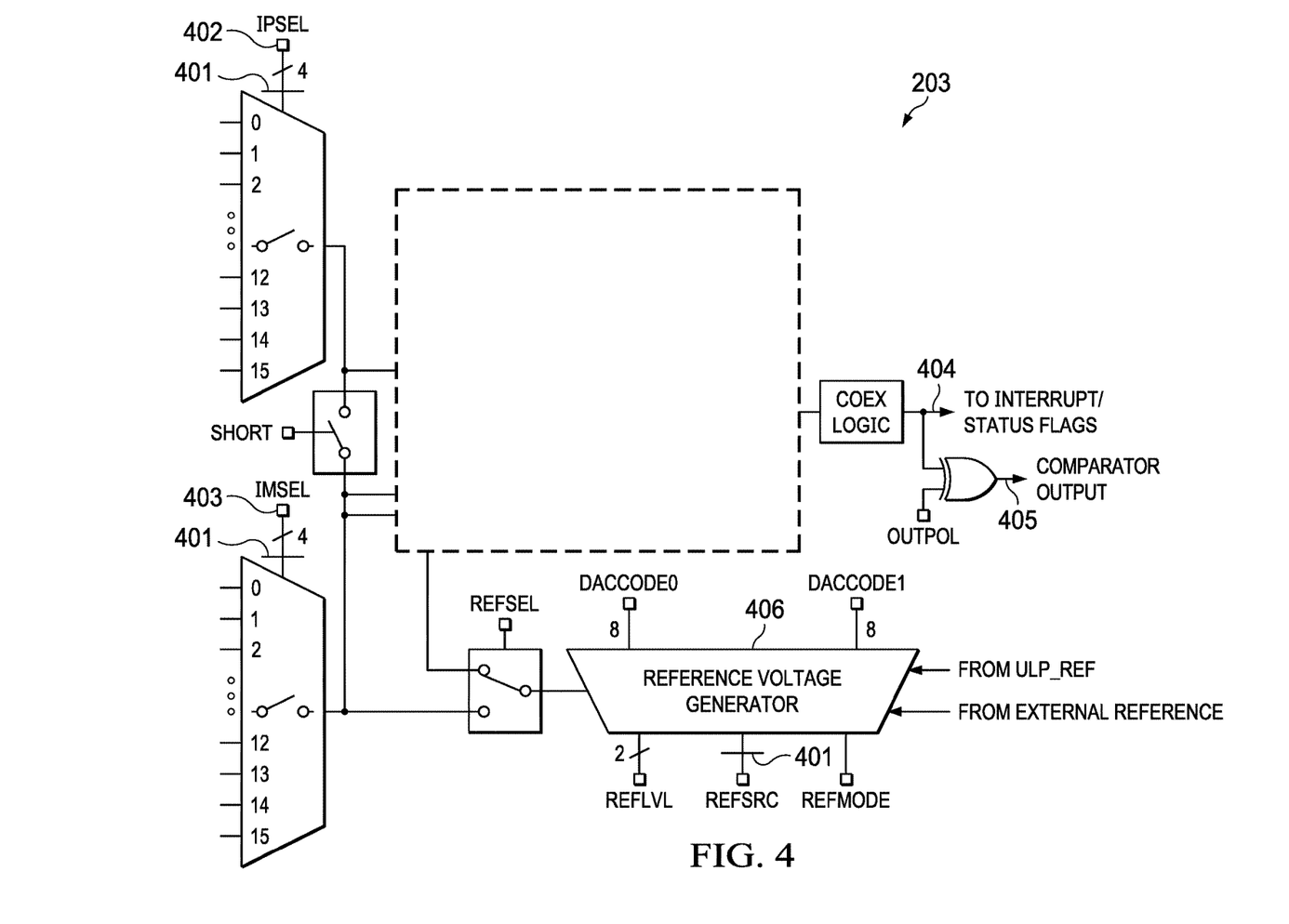
FIG. 4 depicts an exemplary comparator in an analog signal chain.

FIG. 4 illustrates a comparator (400). The comparator (400) includes channels on positive and negative terminals. The channels are not selected solely based on selection signals (402) (IPSEL) and (403) (IMSEL) but are further masked with a MUX signal (401) for authenticating the output (405) of the comparator. If the output (405) is authenticated, then the output (405) is processed as intended. Alternatively, if the output (405) cannot be authenticated, an error interrupt condition (404) can be generated and the output (405) can be ignored or discarded. In at least one embodiment, a security error can be detected when an input is received on a destination input during run-time that does not correspond to a valid source output. An interrupt may be generated upon detection of the security error. In another example, the analog component can be reset and recovered upon detection of a security error. The signal chain configurator may program the authentication block to reconfigure the analog chain during run-time upon detecting an error condition. Additionally, the signal chain configurator can program the authentication block to reconfigure the analog chain during boot time.

The MUX signal (401) may be internally generated in an authentication block based on a destination input and a source output associated with the destination input. Any analog signal chain component can generate MUX signals that MUXes the received input with an authentication signal such as the MUX signal (401). FIG. 4 also illustrates a reference voltage generator (406) with an input that is further multiplexed with the MUX signal (401).

FIG. 5 generally illustrates a register (500) for a COMP, which has multiple bits programmed to indicate validated endpoints. For example, bit 6 (513) refers to a destination input of a DAC. In one embodiment, if the bit reads a logic 0 then the destination input is a validated endpoint and a connection from the COMP to the DAC is allowed. If the bit reads a logic 1 then a connection to DAC is not allowed. Similarly, bit 11 (501) and bit 10 (502) indicate destination inputs from other signal chain components connecting to the COMP. The MUX may further be generated based on the bits in the register (500). It should be noted that the authentication of an input received on an analog component may be implemented in several ways with digital logic using registers and logic gates.

Figure 6:
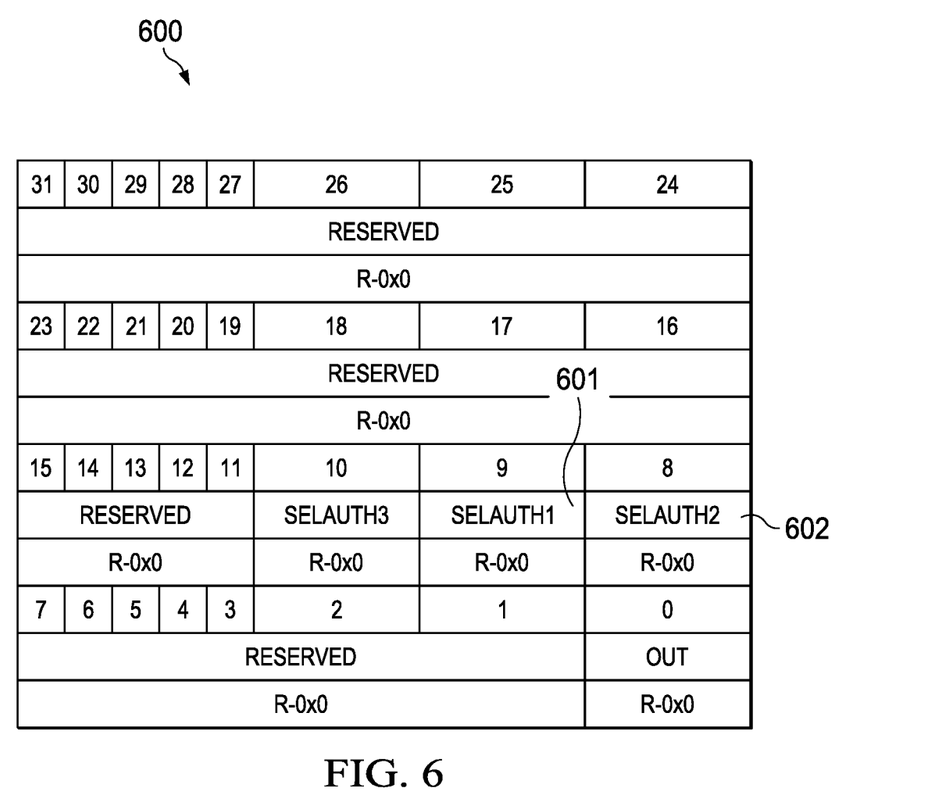
FIG. 6 illustrates an exemplary status register for valid destination inputs (validated endpoints) in a comparator.

FIG. 6 generally illustrates a status register (600) in an authentication block in a comparator component. With reference to both FIGS. 4 and 6, when the comparator channel selection on the positive and negative terminals is authenticated by MUX signal (401), the SELAUTH2 (602) and SELAUTH1 (601) bits in the status register (600) reads a logic 0. When the comparator channel selection on the positive and negative terminals is not authenticated by MUX signal (401), the SELAUTH2 (602) and SELAUTH1 (601) bits in the status register reads a logic 1.

Figure 7:
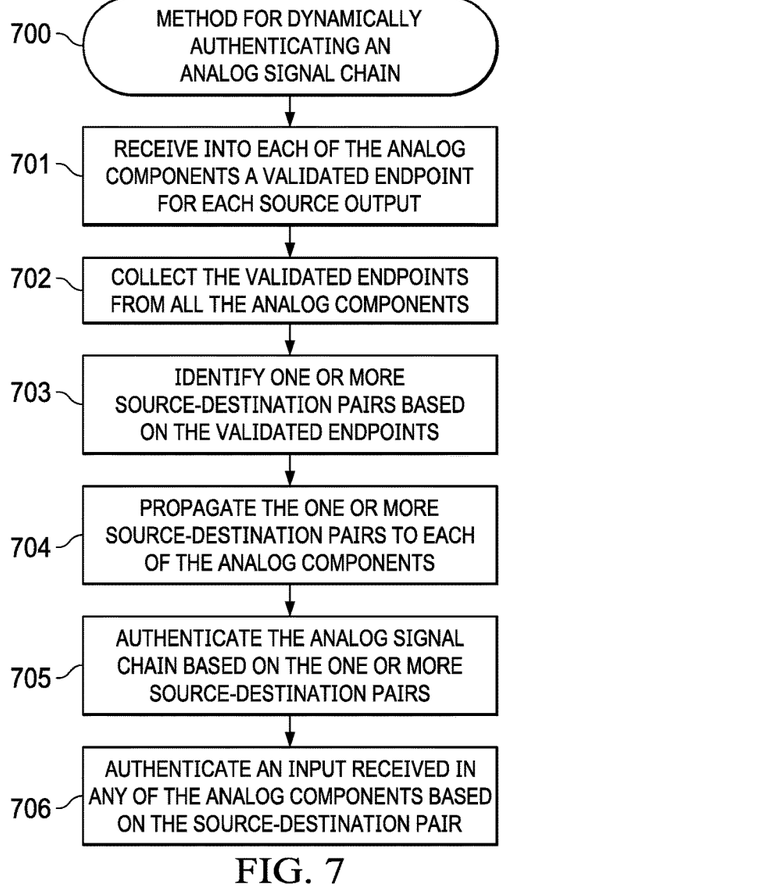
FIG. 7 depicts an exemplary flow chart for dynamically authenticating an analog signal chain.

FIG. 7 illustrates a method (700) for dynamically authenticating a signal chain formed from a plurality of analog components. In step (701) the method receives into each of the analog components one or more validated endpoints for each source output. For example, a signal chain configurator (301) may load destination inputs from an endpoint table (302) into analog components such as the DAC (314), the ADC (315), the COMP (316), and the VRef (317).

In step (702) the method proceeds to collect the validated endpoints from one or more of the analog components. A signal chain integrity block (320) can collect the destination inputs from all the sources. In step (703) the method identifies one or more source-destination pairs based on the validated endpoints. In one embodiment, a signal chain integrity block (320) collects the one or more validated endpoints, associates a source output with each of the one or more validated endpoints to form endpoint pairs, and identifies source-destination pairs based on the endpoint pairs. The data can be stored in a table maintained by the signal chain integrity block (320), an example of which is shown in Table 2.

In step (704) the method propagates the one or more source-destination pairs to each of the analog signal chain components. The one or more source-destination pairs can be received into an authentication block and stored in a register, such as register (500) shown in FIG. 5. The information stored in the register (500) may be used advantageously to generate signals such as MUX signal (401) illustrated in FIG. 4.

Next, in step (705) the method authenticates the signal chain based on the one or more source-destination pairs. In step (706) the method authenticates an input received in any of the analog components based on the one or more source-destination pairs. For example, an input (238) received in a COMP (203) from an OPMAP (201) may be authenticated based on the register bits in register (500) and a status generated in a status register such as register (600).

Figure 8:
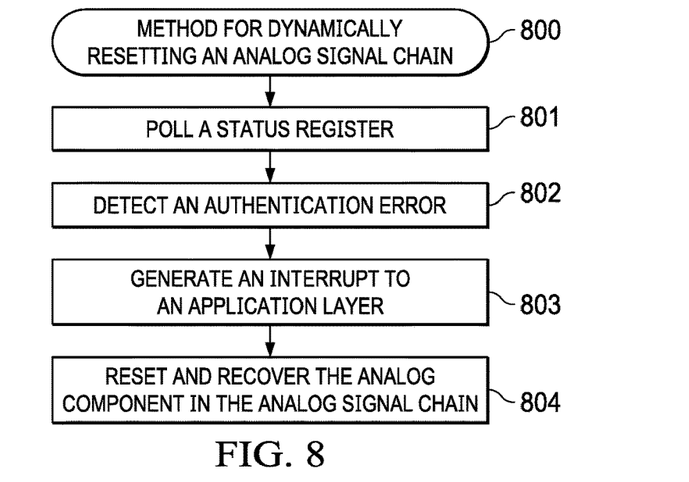
FIG. 8 depicts an exemplary flowchart for dynamically resetting an analog signal chain.

FIG. 8 is a flowchart of a method (800) for dynamically resetting a signal chain. In step (801) the method polls a status register such as bits in status register (600). Next, in step (802) the method detects an authentication error. When the register bit indicates an error, for example, bit (602) reads a 1, then an error is detected. Next, in step (803) the method generates an interrupt to an application and/or software layer. Upon detection of an authentication error in step (802), an interrupt signal (404) may be asserted to alert an application and/or software layer. The method may also detect a security vulnerability and automatically generate an interrupt condition to CPU when there is no software polling involved. The method then proceeds to step (804) to reset and recover the signal chain. For example, an application layer or a software layer may reconfigure the endpoint table and program the authentication blocks based on the type of error and the interrupt received. It should be noted that the interrupt routines and reset mechanism may be implemented in one of several ways known in the art. A user may also program a default condition configured to automatically reset the endpoint table to an initialization condition of the overall system and generate an error notification that security violation has occurred along with the timestamp and associated information for the security attacks. The method may propagate the security error to local application or over the network for recovery actions.

We claim:

1. A method comprising:
   in a signal chain formed from at least a first component connected to a second component, receiving one or more validated endpoints into the first component, wherein the first component includes a set of source outputs and a first authentication block, wherein the second component includes a set of destination inputs and a second authentication block, and wherein the one or more validated endpoints are selected from the set of destination inputs;
   associating each of the one or more validated endpoints with a source output from the set of source outputs to form a set of endpoint pairs;
   identifying a source-destination pair from the set of endpoint pairs;
   propagating the source-destination pair to the first authentication block and the second authentication block;
   authenticating at least a portion of the signal chain based on the source-destination pair; and
   authenticating a received input based on the source-destination pair.

2. The method of claim 1, further comprising:
   generating an interrupt in response to determining that the received input is not authenticated.

3. The method of claim 1, further comprising:
   resetting one or more components of the signal chain in response to detecting a security error.

4. The method of claim 1, wherein the set of destination inputs includes at least two validated endpoints for the first component, the method comprising:
   forming at least a second endpoint pair from the set of source outputs and at the least two validated endpoints.

5. The method of claim 1, wherein the set of components includes a third component having at least one of a source output and a destination input, the method further comprising:
   receiving, into a third authentication block of the third component, a third source-destination pair including the third component.

6. The method of claim 5, further comprising:
   authenticating at least a second portion of the signal chain based on the third source-destination pair.

7. The method of claim 1, further comprising:
   responsive to a failure to authenticate the signal chain, reconfiguring the signal chain during run-time.

8. The method of claim 1, further comprising:
   responsive to a failure to authenticate the signal chain, reconfiguring the signal chain during boot time.

9. A system comprising:
   a signal chain formed from a set of components, wherein the set of components includes at least a first component connected with a second component, wherein the first component has a set of source outputs and a first authentication block, and wherein the second signal chain component has a set of destination inputs and a second authentication block;

a signal chain configurator in communication with the first authentication block, wherein the signal chain configurator populates the first authentication block with at least one validated endpoint selected from the set of destination inputs;

a signal chain integrity block in communication with at least the first authentication block and the second authentication block, wherein the signal chain integrity block is configured to identify a source-destination pair from one or more endpoint pairs formed from the at least one validated endpoint and the set of source outputs, and wherein the signal chain integrity block is configured to propagate the source-destination pair to the first authentication block and the second authentication block; and wherein the second authentication block authenticates any received input using the source-destination pair.

10. The system of claim 9, wherein the first authentication block further comprises a first programmable register, and wherein the first programmable register stores the at least one validated endpoint and a corresponding source output.

11. The system of claim 9, wherein the signal chain configurator further comprises a data structure storing the at least one validated endpoint, and wherein the data structure associates each of the at least one validated endpoints with a corresponding source output from the set of source outputs.

12. The system of claim 11, wherein the data structure is an endpoint table.

13. The system of claim 9, wherein the set of destination inputs and the set of source outputs are general purpose input output pins.

14. The system of claim 9, wherein the first component further comprises one or more destination inputs, and wherein the second component further comprises one or more source outputs.

15. The system of claim 9, wherein the set of components includes a third component, and wherein the third component has at least one of a source output and a destination input, and a third authentication block in communication with the signal chain configurator and the signal chain integrity block.

16. The system of claim 9, further comprising a set of drivers configured to program at least the first component with the at least one validated endpoint.

17. The system of claim 16, further comprising a peripheral firewall between the set of drivers and the set of components.

18. The system of claim 9, further comprising a system configuration tool communicatively coupled with the signal chain configurator, wherein the system configuration tool receives user-generated data identifying the at least one validated endpoint.

19. The system of claim 9, wherein the set of components includes a comparator configured to receive a set of selection signals and a multiplexer signal masking the set of selection signals, wherein the multiplexer signal authenticates an output of the comparator.

20. The system of claim 19, wherein the first authentication block and the second authentication block is each configured to generate the multiplexer signal.

* * * * *